United States Patent [19]
Denman

[11] 3,794,188
[45] Feb. 26, 1974

[54] STORAGE SILOS AND BOTTOM UNLOADERS THEREFOR

[75] Inventor: Dennis Denman, Princes Risborough, England

[73] Assignee: Austin Hoy and Company Limited, Buckinghamshire, England

[22] Filed: May 17, 1971

[21] Appl. No.: 144,020

[52] U.S. Cl. ............ 214/17 DA, 37/191 A, 198/170
[51] Int. Cl. ............................................ B65g 65/24
[58] Field of Search ... 214/17 DA, 17 DB; 198/170; 299/82–84; 143/135; 37/83, 86, 191 A, 192 A

[56] References Cited
UNITED STATES PATENTS

| | | | |
|---|---|---|---|
| 3,182,824 | 5/1965 | Schleich | 214/17 DA |
| 3,035,718 | 5/1962 | Behlen | 214/17 DA |
| 3,229,828 | 1/1966 | Kucera | 198/170 X |
| 3,110,391 | 11/1963 | Warren | 198/170 X |
| 2,933,295 | 4/1960 | Rollins | 299/91 |

FOREIGN PATENTS OR APPLICATIONS 1,217,279 5/1966 Germany.......................... 214/17 DA

*Primary Examiner*—Robert G. Sheridan
*Attorney, Agent, or Firm*—Brady, O'Boyle & Gates

[57] ABSTRACT

The invention provides a bottom unloader for a storage silo, of the kind comprising a sweep arm pivoted at a position adjacent to the silo wall and carrying a cutter chain which conveys the cut silage to a discharge outlet, wherein the problem of the silage trapping the sweep arm is overcome by arranging some of the cutters on the chain to be upwardly extending preferably to overlie the top of the arm. In an alternative embodiment the cutter teeth are pivoted on the chain so that when the chain is moved in one direction round the arm the teeth extend at right-angles to the chain and when the chain is moved in the opposite direction the teeth move into an inoperative position in which they extend parallel to the chain.

7 Claims, 16 Drawing Figures

PATENTED FEB 26 1974 3,794,188

INVENTOR
DENNIS DENMAN
BY Brady, O'Boyle & Gates
ATTORNEYS

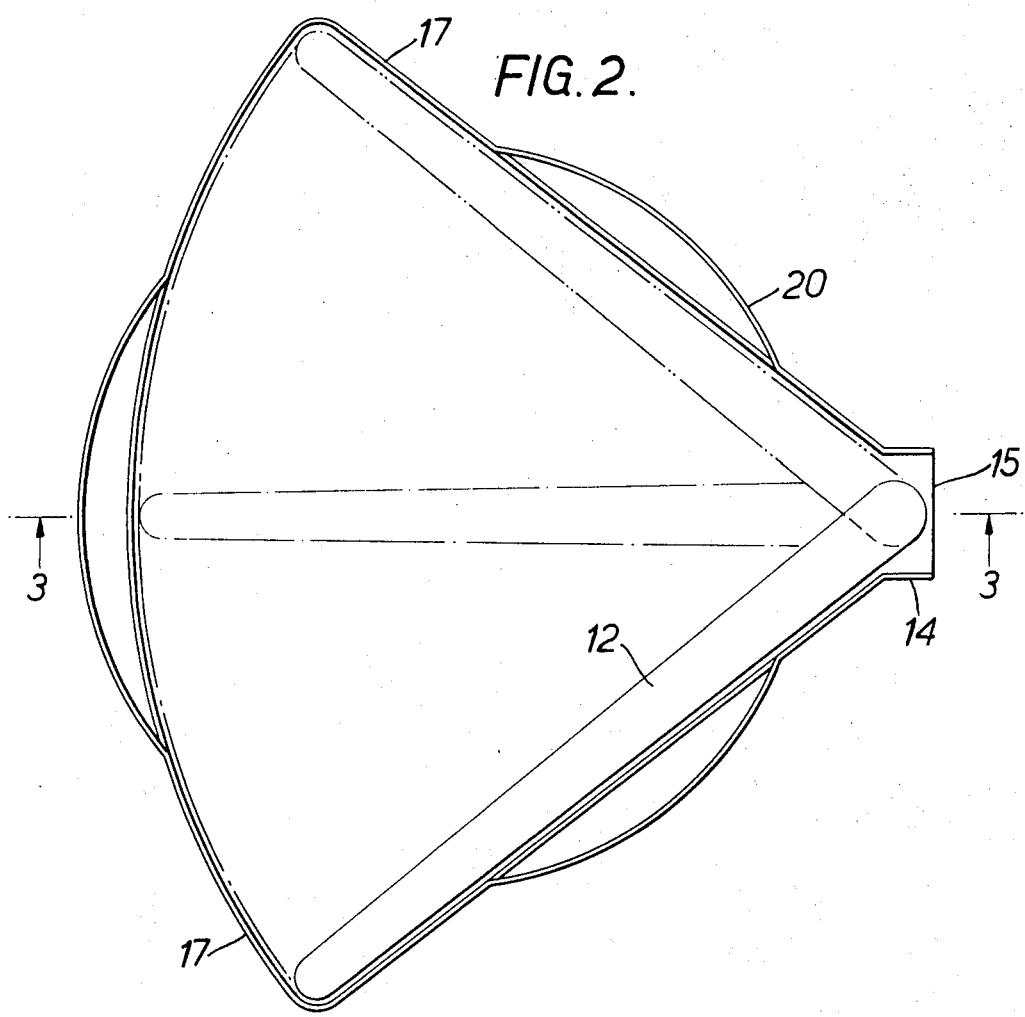

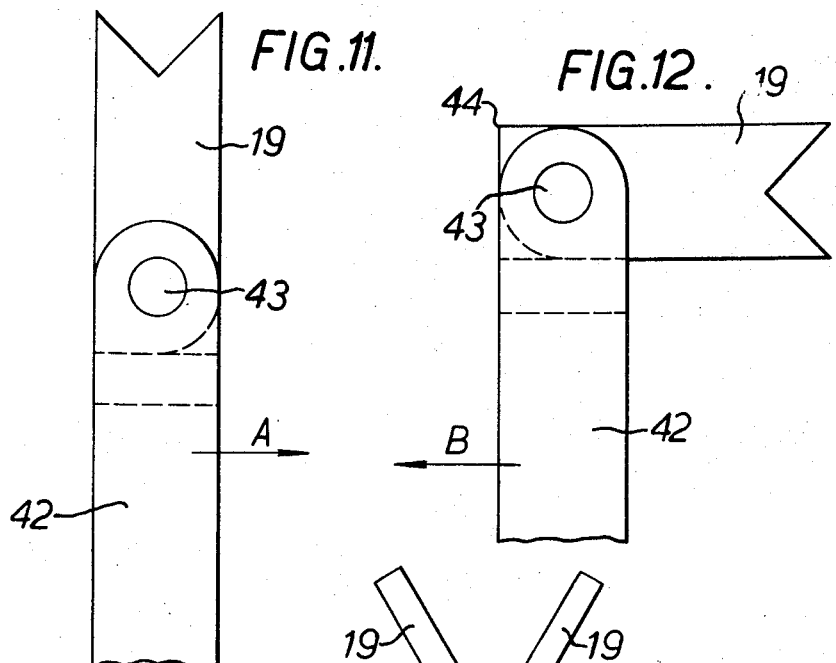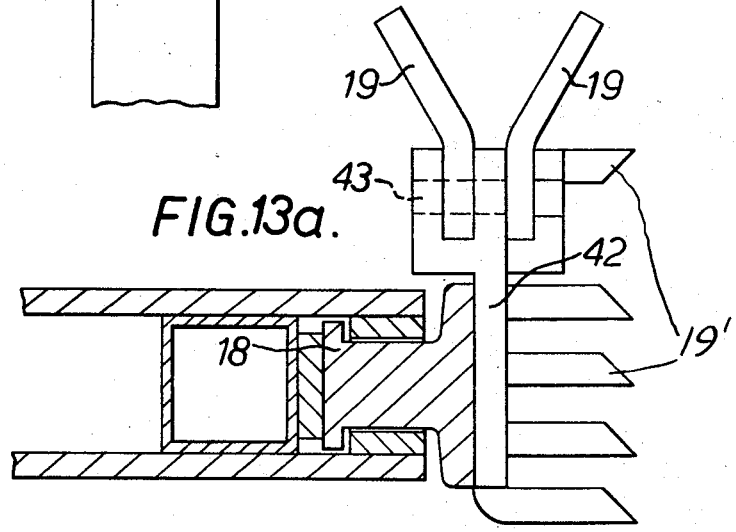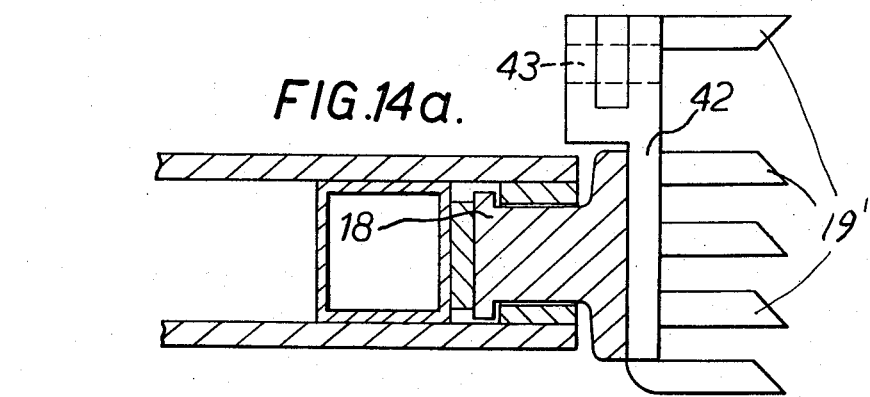

STORAGE SILOS AND BOTTOM UNLOADERS THEREFOR

The invention relates to silos for storing discrete materials (e.g. silage), and to bottom unloaders for such silos.

In United Kingdom Pat. No. 1092262 there is described a silo having a bottom unloader and comprising a conveyor arm disposed in the silo and mounted at a position adjacent to the periphery of the silo for pivotal movement so that the conveyor arm can sweep horizontally over a major portion of the cross-section area of the silo at the base thereof and remove silage therefrom, the silo being provided with two outwardly extending recesses or pockets in its periphery for accommodating the end of the conveyor arm distant from the pivot at the limits of the movement of the arm, and the arrangement being such that movement of the conveyor arm between said limits leaves unswept a plurality of spaced peripheral portions of the silo. Such a silo is hereinafter called "a silo of the kind referred to".

One of the difficulties with sweep arm unloaders is that movement of the sweep arm is impeded, and in extreme cases prevented, by the weight of silage bearing down on it. It is an object of the invention to mitigate this difficulty.

One method of relieving this difficulty is by the use of specially disposed cutters.

From one aspect the present invention provides a bottom unloader for a silo, comprising a sweep arm, a pivotal mounting on said arm adjacent an end thereof, whereby the arm can be swung laterally, chain guides along sides of said arm, an endless cutter chain mounted in said guides, a plurality of laterally directed cutters carried by said chain, and a plurality of upwardly directed cutters carried by said chain, over only a minor part of the length thereof.

The upwardly directed cutters preferably overlie the upper surface of the sweep arm and in operation traverse a substantial portion of the said upper surface. By providing the upwardly directed cutters only over a small portion of the length of the cutter chain, on shutdown they can all be positioned on the portion of the sweep arm which lies outside the silo, at the same time. The upwardly directed cutters should be so positioned when the bottom unloader is not in use. Preferably the upwardly directed cutters include a removable specially disposed cutter capable of traversing a relatively large portion of the upper surface of the sweep arm and which is used if and when the sweep arm becomes trapped and which is removed during normal operation of the unloader.

The means for swinging the conveyor arm, while it is operating to extract silage is preferably such that the arc of swing can be varied. Said means may comprise limit switches.

If desired at least one upwardly extending cutter may extend to a point adjacent the centre line of the sweep arm. This cutter is preferably removable. It is preferred to provide rubbing strips on the upper surface of the sweep arm to support the upwardly extending cutters.

From another aspect the invention provides a silo for a bottom unloader of the kind defined above, comprising means for supporting an arch of compacted silage in the silo, which arch extends over the sweep arm, said supporting means comprising one or more substantially horizontal surfaces positioned in the silo adjacent to the periphery thereof and above the level of the sweep arm. Advantageously the supporting means are in the form of steps or shelves mounted on the peripheral wall of the silo.

In this manner the full pressure of the silage (which may have a total weight of the order of several hundred tons) does not fall upon the sweep arm. It is a disadvantage of known constructions that because the full pressure of the silage bears upon the sweep arm, excessively high power is necessary to drive the sweep arm. It has been found that by providing steps in the silo as defined above, an arch or bridge of compact silage is formed above the sweep arm and that pieces of the roof of the arch fall down and are collected and removed by the sweep arm.

It will be appreciated that as the arch increases in size, the unswept areas decrease in size and consequently the material in those areas is subjected to a greater pressure from the overlying silage column. Thus the material in those areas is compressed so that compacted silage tends to move down and bear on top of the sweep arm. The aforesaid steps support the column when the compression in said areas would otherwise be greatest.

From yet another aspect the present invention provides a method of operating a bottom unloader as defined above for a silo of the kind referred to, comprising the upwardly extending cutters outside the main body of silage when the unloader is shut down. Preferably a speicially disposed cutter is attached to the chain for use if and when the sweep arm becomes trapped, the special cutter being removed for normal operation of the unloader.

According to a further aspect of the invention (which avoids the necessity for removable auxiliary cutters) there is provided a bottom unloader comprising a sweep arm, a pivotal mounting on said arm adjacent an end thereof whereby the arm can be swung laterally, chain guides along sides of said arm, an endless cutter chain mounted in said guides, means for slewing the arm, and means for driving the chain round the arm, the cutter chain having a plurality of cutter teeth secured thereto in such manner that at least some of the cutter teeth are pivotable from a working position, in which the teeth extend transversely of the chain, to a position in which the teeth extend longitudinally of the chain, stop means being provided to limit pivotal movement of the cutter teeth in one direction so as to determine the working position of the cutter teeth.

Preferably the cutter teeth are mounted on shanks which are secured to, or formed integrally within, the chain. If desired more than one cutter tooth may be mounted on each shank. Advantageously a plurality of fixed cutter teeth are also secured to the chain, the arrangement being such that the pivotally mounted cutter teeth, when in their operative positions, extend further from the chain than do the fixed cutter teeth. Thus when the chain is moved in one direction, the pivotably mounted cutter teeth extend longitudinally of the chain and are inoperative, and when the chain is moved in the other direction, the pivotable teeth engage the silage and are thus moved to their working position so as to cut the silage to a greater depth than is provided by the fixed teeth. If desired the fixed teeth may be mounted on the shanks.

The invention is diagrammatically illustrated, by way of example, in the accompanying drawings, in which:

FIG. 2 is a sectional plan view of the silo of FIG. 1 and showing the unloader;

FIG. 11 is a side elevation of a cutter tooth of an unloader showing the tooth in its working position;

FIG. 12 is a view corresponding to FIG. 11 and showing the tooth in its inoperative position;

FIG. 13a is a cross-sectional end elevational through part of an unloader and showing the chain of FIG. 13;

FIG. 14a is a cross-sectional end elevation through part of an unloader and showing the claim of FIG. 13.

Figure 1:
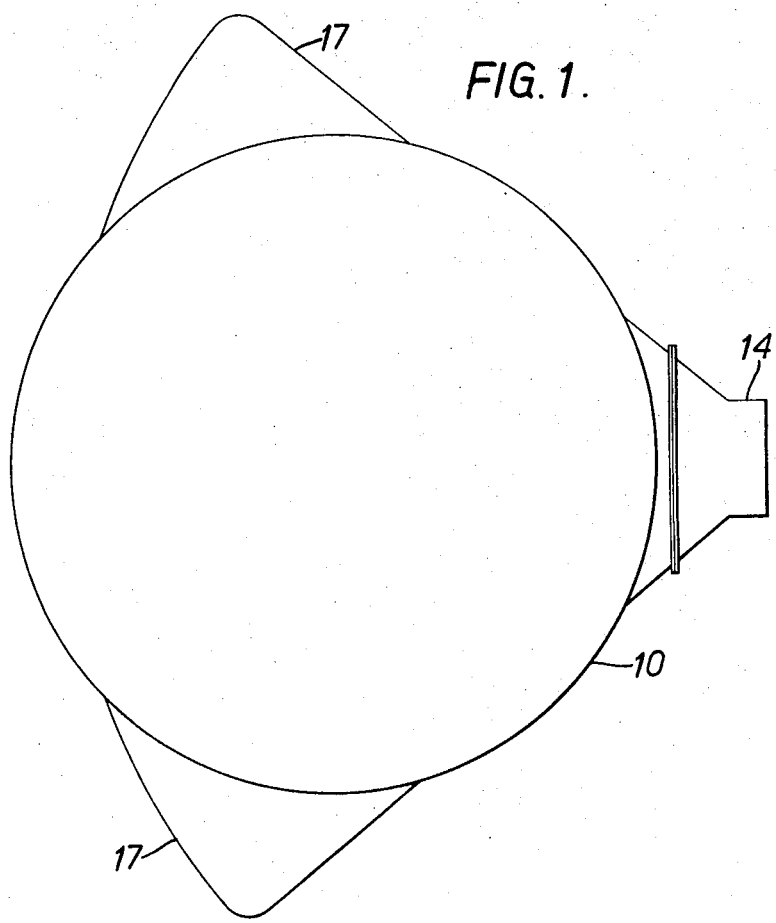
FIG. 1 is a plan view of a silo having a bottom unloader.
Figure 3:
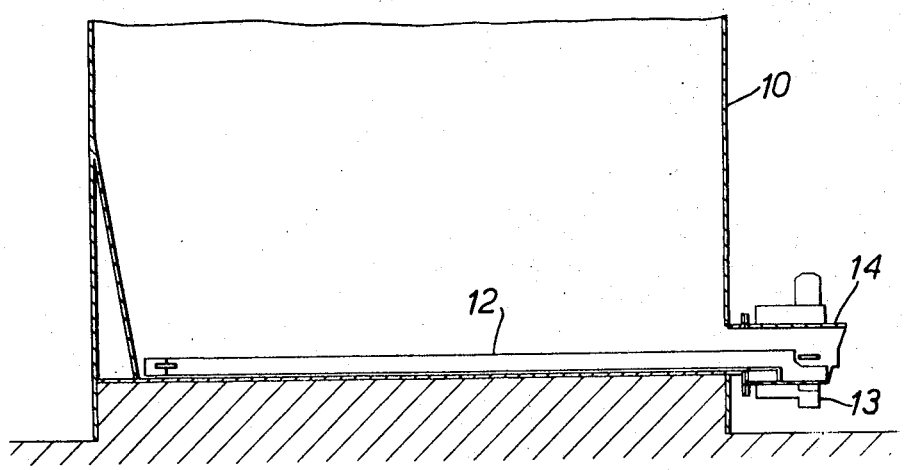
FIG. 3 is a section on the line 3—3 in FIG. 2.
Figure 4:
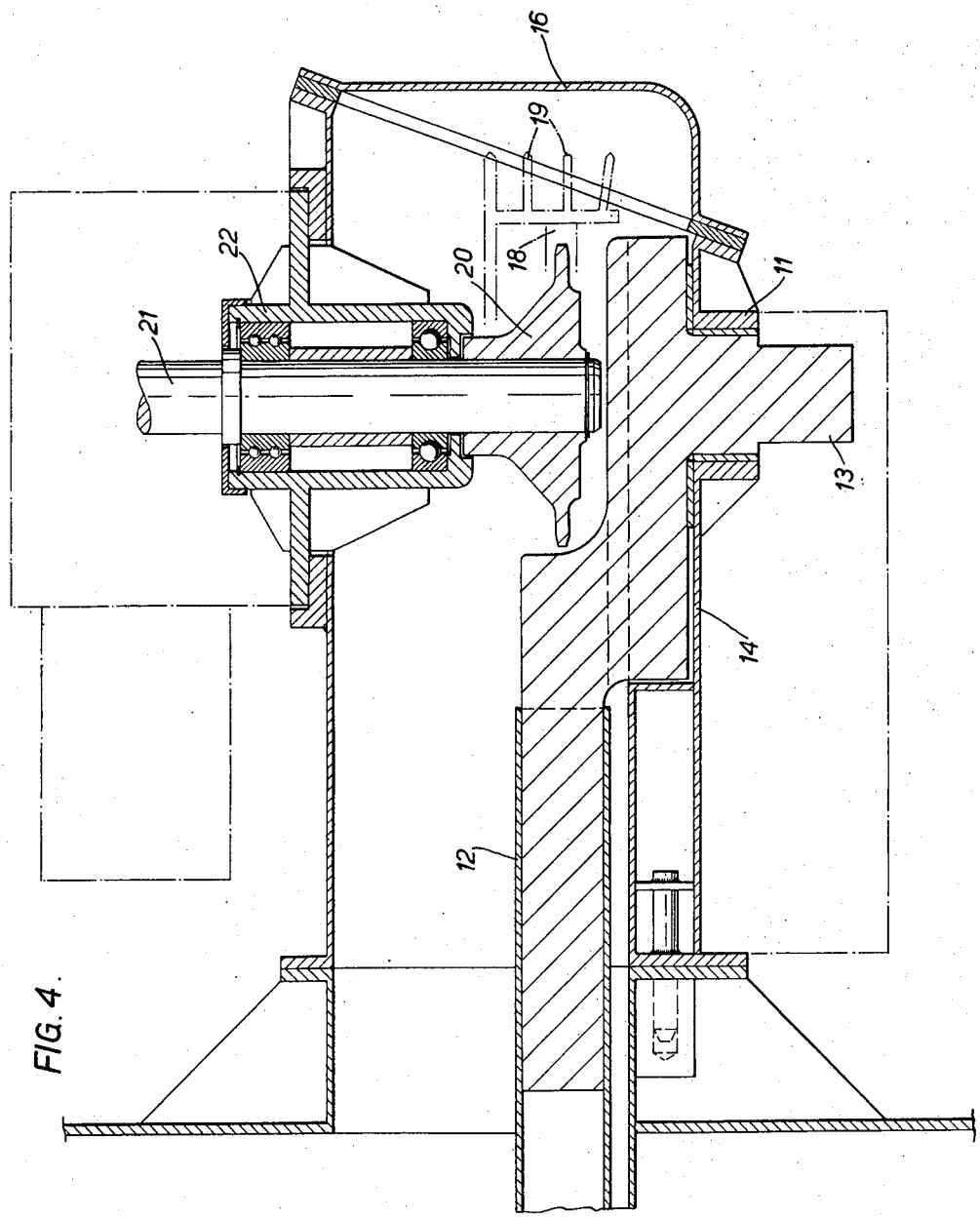
FIG. 4 is a sectional view on an enlarged scale of the drive end of the unloader.

Referring to FIGS. 1 to 4 of the drawings a generally cylindrical silo 10 has a bottom unloader comprising a sweep arm 12 mounted on a pivot shaft 13 journalled outside the silo in bearings 11 in a housing 14 having a discharge outlet 15 for material removed from the silo. A removable door 16 is provided for closing the outlet 15 when the unloader is not in use. The shaft 13 can be driven by a motor to cause the arm 12 to sweep through an arc of about 80° across the silo floor, although alternatively the arm could be slewed by means of hydraulic rams. Reversing means are provided so that the arm sweeps to and fro through said arc. Outwardly extending cavities 17 in the silo wall accommodate the free end of the arm 12 at the limits of its sweep. The arm 12 carries a chain 18 on which are mounted cutters 19 which have cutting edges on both sides so that the chain can be driven in both directions to undercut the material in the silo and convey the cut material to the outlet. The chain 18 passes round a drive sprocket 20 on a shaft 21 in a bearing assembly 22 mounted in the housing 14. A motor drives the shaft 21 and means are preferably provided for reversing the direction of movement of the chain when the direction of sweep of the arm 12 is reversed.

Figure 5:
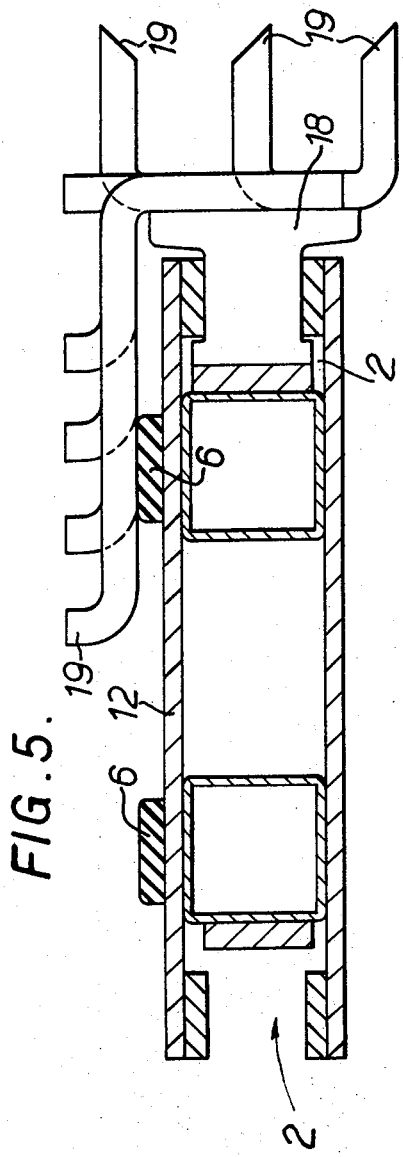
FIG. 5 is a cross-sectional side elevation through the unloader.

In FIG. 5 of the drawings, there is shown a cross-section through the sweep arm 12, the arm being provided with a peripheral guide groove 2 in which the endless cutter chain 18 is slidably mounted. The cutter chain 18 carries a plurality of laterally projecting cutters 19 which are disposed at different levels so that the depth of cut afforded by the chain is greater than the vertical thickness of the sweep arm. In the arrangement shown, cutters 19 are provided at three different levels, and are secured (in a manner more fully explained with reference to FIGS. 6 to 8) in sequence to alternate links of the chain. Also secured to the chain is a series of upwardly extending or top cutters 19 which are bent to overlie the upper surface of the arm 12. The top cutters are of different lengths and are mounted over a short length of the chain, so that when the unloader is shut-down, they can be parked outside the body of silage in the silo. The free end of each top cutter is bent upwardly so as to extend substantially vertically. Rubbing strips 6 are provided on the top surface of the arm 12 and are positioned so as to support the longer of the top cutters.

Thus, in operation, when the chain is rotated about the arm, the cutters 19 traverse substantially the whole of the side and top surfaces of the arm so that build-up of silage on the top surface of the arm is prevented. It is preferred normally to run the unloader without the longest of the top cutters 19, and only to use this cutter if and when the arm is trapped by the weight of silage in the tower. Thus the longest top cutter is removable.

Figure 7:
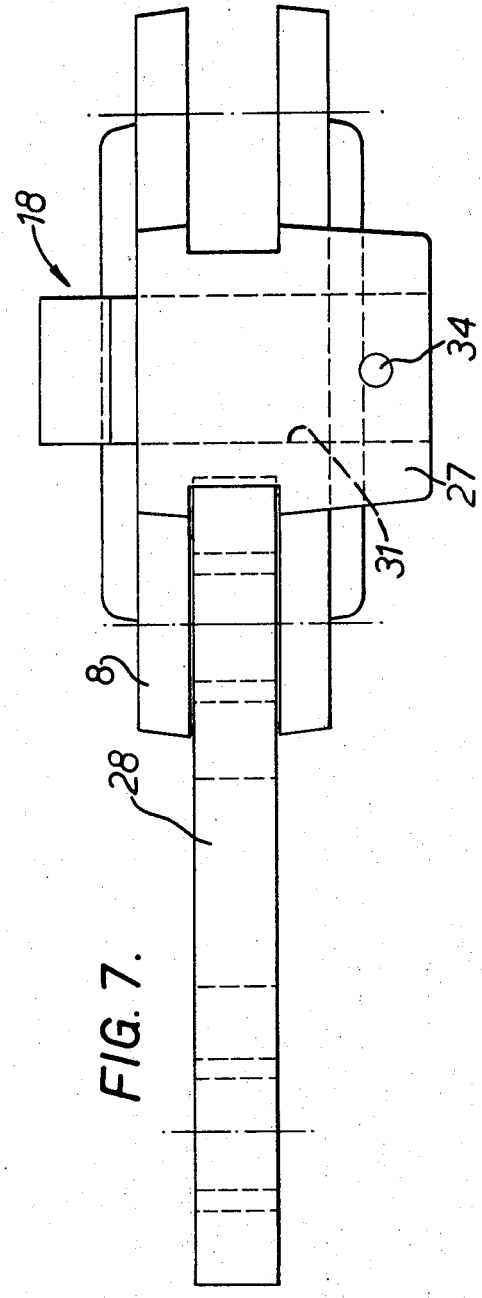
FIG. 7 is a side view of the chain shown in FIG. 6.
Figure 6:
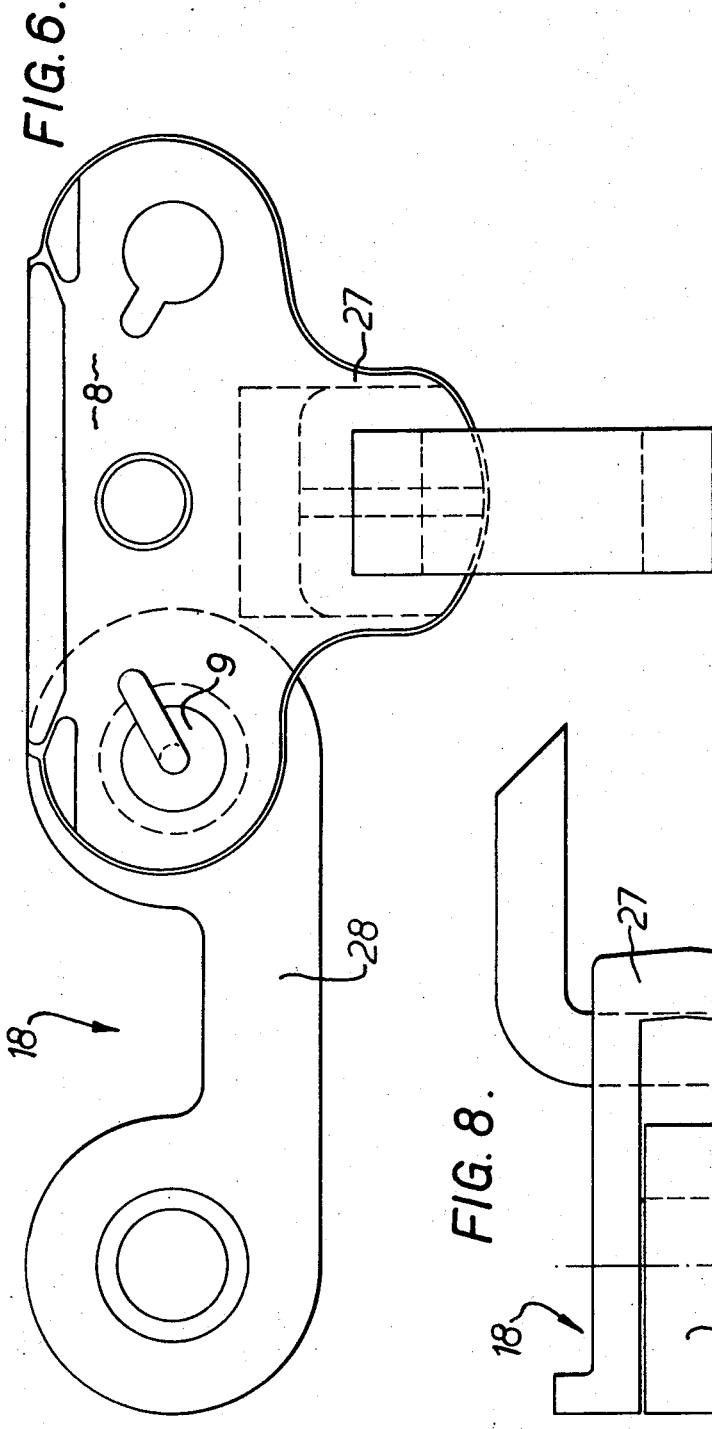
FIG. 6 is a plan view of part of the unloader chain.
Figure 8:
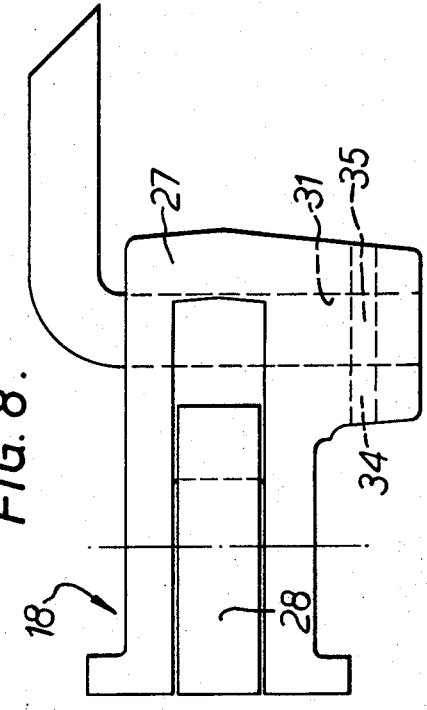
FIG. 8 is an end view of the chain shown in FIGS. 6 and 7.

Referring to FIGS. 6 to 8 of the drawings, the chain 18 comprises a plurality of links 8 provided with integral cutter-supporting boxes 27, the links 8 being joined by means of pivot pins 9 to interconnecting links 28. Each cutter box 27 is formed with a substantially vertical cavity 31 in which the shank of the cutter can be received. A bore 34 is formed in the cutter box which is arranged to align with a bore 35 formed in the cutter so that the cutters can be secured in position in their respective boxes 27 by means of, for example, dowel pins (not shown) which are arranged to lie in the bores 34 and 35. Although a laterally extending cutter is shown in FIGS. 6 to 8, it will be appreciated that the top cutters are mounted in their boxes and secured thereon in an identical manner.

As will be seen from FIG. 5, the lowermost of the laterally projecting cutter members are inverted in their boxes 27, that is to say they extend from the bottoms of their respective boxes instead of from the tops thereof.

The cutters which are positioned intermediate the uppermost and lowermost cutters, are secured to the chain by means of screws or bolts (not shown) passing through the shank sections thereof.

Figure 9:
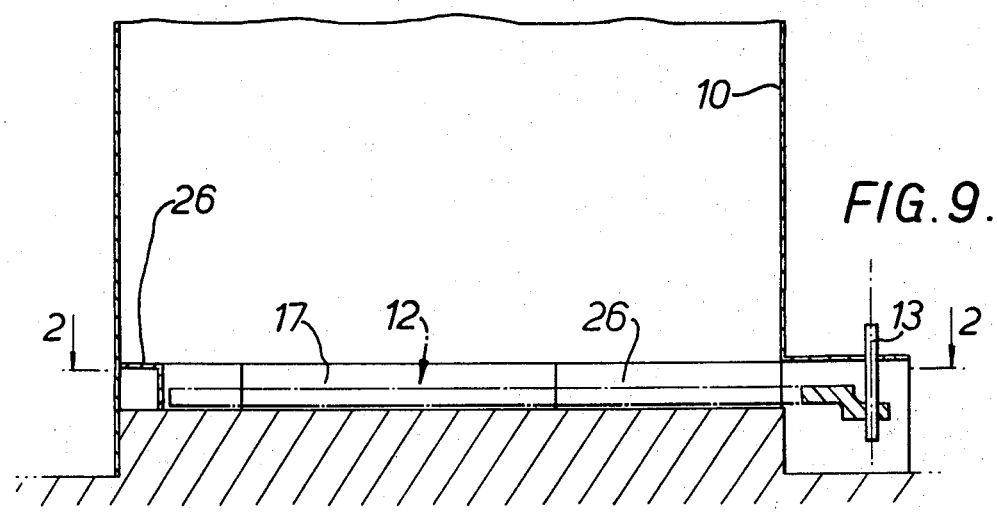
FIG. 9 is a vertical cross sectional elevation through a modified form of silo.
Figure 10:
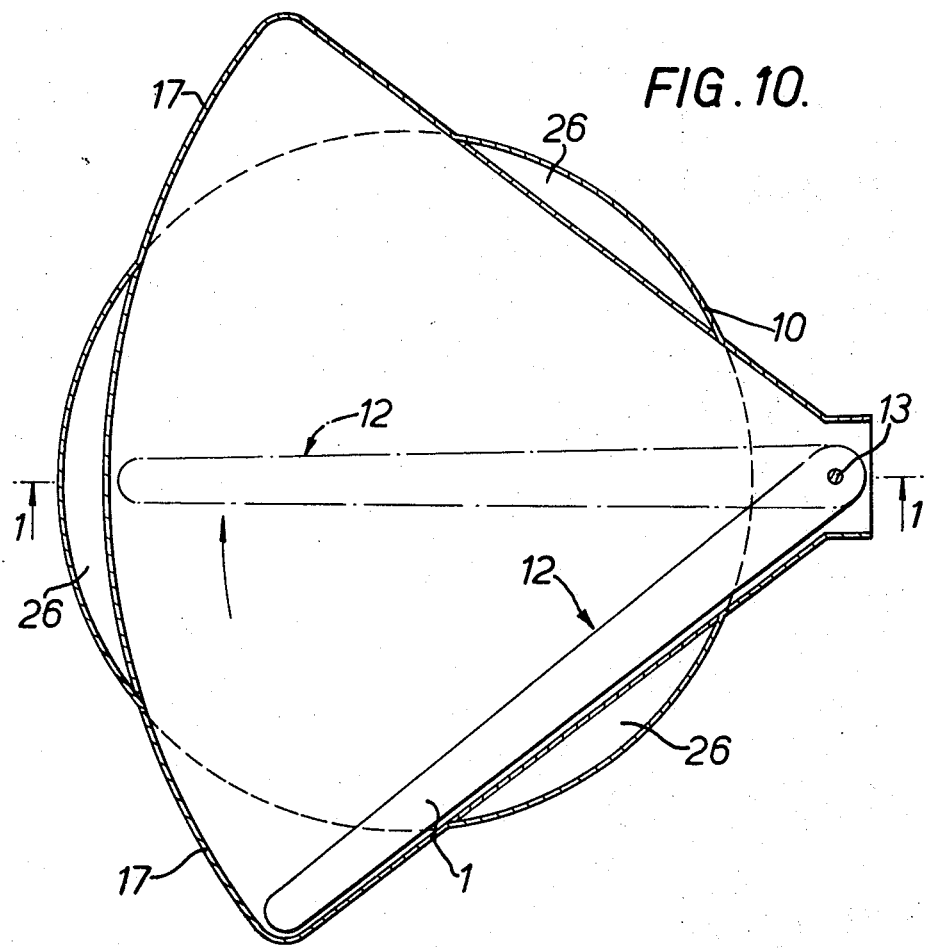
FIG. 10 is a plan view of the silo shown in FIG. 9.

Referring to the FIGS. 9 and 10 of the drawings there is shown a generally cylindrical silo of the kind described above and having a vertical wall 10, at the lower end of which is pivotally mounted a sweep conveyor arm 12 adapted to be slewed across the floor of the silo through an arc of substantially 80°. The conveyor arm is pivotally mounted outside the circular wall 10 of the silo. As shown in FIG. 10 outwardly extending bulges 17 are formed in the wall of the silo to accommodate the free end of the arm 12 when it is at the limits of its range of movement. Thus during sweeping of the conveyor arm across the silo floor, three equi-spaced areas 26 of the cross-section of the silo are left unswept, and each area 26 is formed with a flat-topped step having its upper surface horizontal and adjacent to the extremities of the path of the conveyor arm 12, and immediately above the level of the conveyor arm.

In practice, when commencing to unload the silo, the conveyor arm is swung as aforesaid over an arc substantially less than the maximum. The silage column is therefore partly undercut and material is extracted from the silo. With appropriate silage (e.g., grass silage or a lighter silage) as a result of the undercutting an "arch" of compacted silage forms over the undercut area and silage falls from the arch to form in the undercut area a comparatively loose mass which can be extracted by the conveyor arm with relatively little power consumption. The arc of swinging and thus the undercut area is gradually increased and the cutting of compacted silage at the edges of the undercut area requires more power than simple removal of loose silage. However, the power requirements are still less than for continually undercutting an area over the whole of which silage is compacted. The unswept portions of the silage column provide supports for the arch of silage. As those unswept portions become smaller in area and there is an increasing tendency for the weight of the column to compress the unswept parts of the column so that the arch, comprising compacted silage, tends to press down onto the top of the conveyor arm and impede its movement. For this reason the portions of the silo which are unswept when the arm is swinging over its maximum arc are provided with the steps described above to bear the weight of the silage and prevent the arch from bearing on the conveyor arm.

Means (not shown) are provided for swinging the sweep arm in the silo, which means preferably comprises a pair of opposed hydraulic rams disposed adjacent to the position 11. Preferably the direction of travel of the chain is reversed each time the direction of rotation of the sweep arm is reversed, although it has been found that this step is not essential.

Means, preferably including limit switches, are provided for swinging the sweep arm, while it is operating to extract silage, over an arc substantially less than the maximum and symmetrically about a diameter of the silo, said means permitting the arc of swinging to be gradually increased to the maximum. As hereinbefore explained, the initial extraction of silage is effected by swinging the arm over a comparatively small arc and the arc of swinging is subsequently gradually increased to the maximum. It will be understood that in order that the benefit of the arrangement is fully obtained the dimensions of the silo and the characteristics of the silage should be such that an arch of silage is formed as hereinbefore discussed.

The arm 12 is provided with one or more skids (not shown) spaced away from its pivot position and engaging the silo floor so as to support the arm. Where the direction or rotation of the chain about the arm is to be reversed, it is preferred to delay reversal until after the arm has moved away from the limiting positions of the arc of movement of the arm. This is to prevent both runs of the cutter chain from being loaded with silage at the same time.

Figure 13:
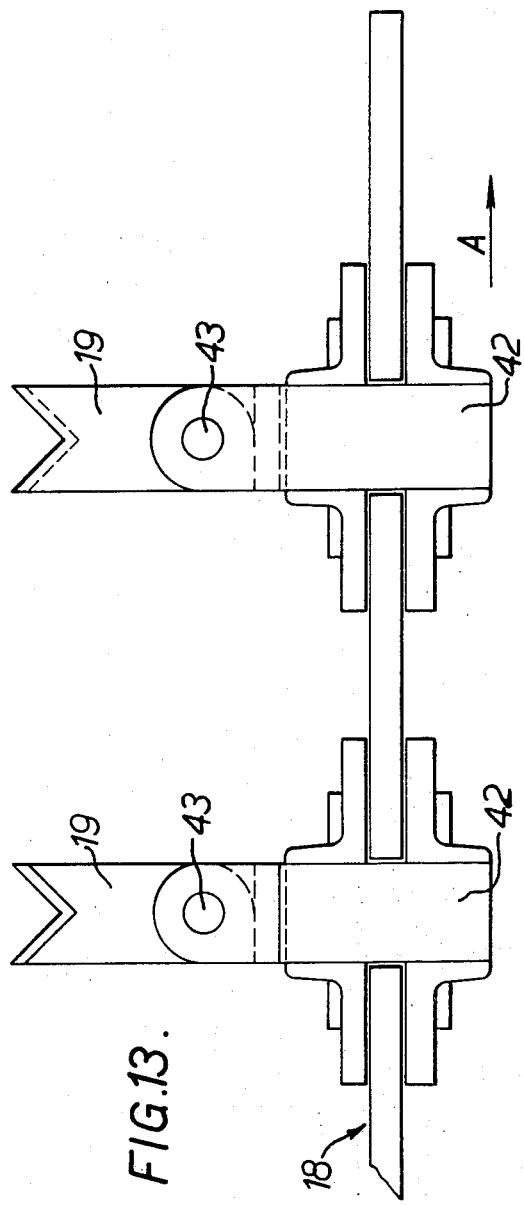
FIG. 13 is a view generally similar to FIG. 11 and showing a pair of cutter teeth mounted on an unloader chain.
Figure 14:
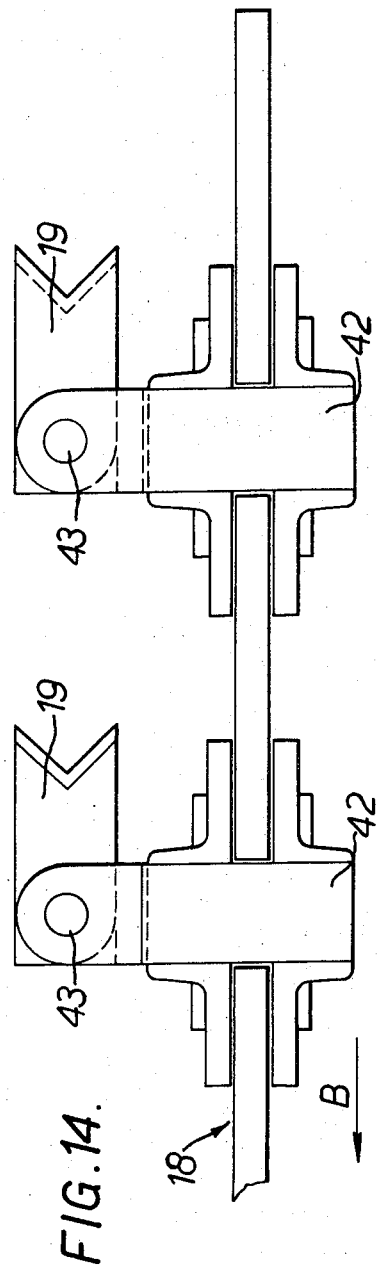
FIG. 14 is a view generally similar to FIG. 12 and showing a pair of cutter teeth mounted on an unloader chain.

Referring to FIGS. 11 to 14 of the drawings there is shown a cutter chain 18 to which are secured shanks 42 pivotally mounting cutter teeth 19 by means of pins 43. The pivotally mounted end of each tooth 19 is provided with a projection 44 which forms a stop for limiting the pivotal movement of the tooth so as to define a working position as shown in FIGS. 11 and 13.

If desired the cutter teeth instead of being flat may be bent for example as shown in FIG. 13a. Instead of having generally horizontal pins 43 with the teeth swinging in a vertical plane, the pins could, if desired, be vertical with the teeth swinging in a horizontal arc.

As shown in FIGS. 13a and 14a the chain 18 is also provided with a number of fixed teeth 19. The shanks of the cutters may be mounted on the chain in the manner described with reference to FIGS. 6 to 8 of the drawings.

In operation when the chain is moved in the direction indicated by arrow A, the teeth 19 engage the material to be cut and pivot into their working positions in which they are retained by the stops 44. The depth of cut afforded by the chain is thus relatively large. If however, the direction of travel of the chain is reversed, as shown by arrow B, the teeth 19, due to frictional contact with the material to be cut, pivot into their inoperative position and thus the depth of cut of the chain is reduced.

I claim:

1. A bottom unloader for a silo having a discharge opening in the wall thereof at the silo base adjacent the silo floor, comprising a sweep arm, a pivotal mounting on said arm adjacent to an end thereof whereby the arm can be swung laterally across the silo floor, means for swinging the sweep arm, means pivotally connecting the sweep arm to the silo whereby the pivotal connection is disposed adjacent to and outside of the silo wall, chain guides along the sides of said sweep arm, an endless cutter chain mounted in said guides, a plurality of laterally directed cutters connected to said chain for cutting and conveying silage towards the discharge opening, a plurality of upwardly directed cutters connected to said chain over only a minor part of the length thereof so that when the unloader is not in use said plurality of upwardly directed cutters can all be parked outside the silo on the portion of said sweep arm outside the silo.

2. A bottom unloader as set forth in claim 1, wherein at least some of said plurality of upwardly directed cutters overlie said sweep arm so as to traverse at least part of the upper surface thereof, and rubbing strips connected on the upper surface of said sweep arm adapted to engage and support said upwardly directed cutters.

3. A bottom unloader according to claim 2, wherein said plurality of upwardly directed cutters comprises removable cutters overlying the sweep arm and adapted to traverse a relatively large amount of the width of the top of the said upper surface.

4. The combination of a silo and a bottom unloader comprising a silo comprising a substantially vertical wall for enclosing and storing a silage column, a discharge opening in the vertical wall adjacent to the silo base, a sweep arm, a pivotal mounting on said arm adjacent to an end thereof whereby the arm can be swung laterally across the base of the silo, means connected to swing said sweep arm, means pivotally connecting the sweep arm to the silo wall whereby the pivotal connection is disposed adjacent to the silo vertical wall, support means for supporting an arch of compacted silage in the silo which extends over said sweep arm so as to relieve said sweep arm of some of the weight of the silage column, said support means comprising at least one substantially horizontal surface positioned in the silo adjacent to the substantially vertical wall thereof and immediately above the level of the sweep arm, chain guides along sides of said arm, an endless cutter chain mounted in said guides, a plurality of laterally directed cutters connected to said chain for cutting and conveying silage towards the discharge opening.

5. The combination as set forth in claim 4, in which said pivotal connection of said sweep arm is outside of said substantially vertical wall, and including a plurality of upwardly directed cutters connected to said endless cutter chain over only a minor part of the length thereof so that when the unloader is not in use the upwardly directed cutters can all be positioned outside the silo on the portions of said sweep arm outside of said substantially vertical wall.

6. The combination claimed in claim 4, wherein said support means are in the form of a plurality of steps spaced around the substantially vertical peripheral wall of the silo.

7. A bottom unloader for a silo having a discharge opening in the wall thereof at the silo base adjacent the silo floor, comprising a sweep arm, a pivotal mounting on said arm adjacent to an end thereof whereby the arm can be swung laterally across the silo floor, means connected to swing said sweep arm, means pivotally connecting the sweep arm to the silo by said pivotal mounting whereby the pivotal mounting is disposed adjacent to the silo wall, chain guides along the sides of said sweep arm, an endless cutter chain mounted in said guides, the cutter chain having a plurality of cutter teeth pivotally secured thereto, said plurality of cutter teeth being pivotable from a working position in which the plurality of cutter teeth extend transversely of said chain to a position in which the plurality of cutter teeth extend longitudinally of said chain, stop means being provided on the chain and adapted to engage and limit pivotal movement of said plurality of cutter teeth in one direction so as to determine the working position of the plurality of cutter teeth, said chain also having secured thereto a plurality of fixed cutter teeth extending laterally of the chain at substantially right angles to said plurality of pivotable cutter teeth, the length of said pivotably mounted cutter teeth being such that the plurality of pivotally mounted cutter teeth when in their operative positions extend further from said chain than do the fixed cutter teeth, and the fixed and pivotable cutter teeth serving to cut and convey silage towards the discharge opening.

* * * * *